United States Patent [19]

Martin et al.

[11] Patent Number: 5,771,087

[45] Date of Patent: Jun. 23, 1998

[54] EYEWEAR AND NOSEPAD FOR USE WITH EYEWEAR

[75] Inventors: Brent R. Martin; Sean G. Sullivan, both of North Vancouver, Canada

[73] Assignee: Sentinel Importing Corporation, North Vancouver, BC, Canada

[21] Appl. No.: 730,784

[22] Filed: Oct. 16, 1996

[51] Int. Cl.$^6$ .................................................. G02C 5/12
[52] U.S. Cl. ........................................... 351/136; 351/139
[58] Field of Search ................................. 351/136, 138, 351/139, 78, 80, 82

[56] References Cited

U.S. PATENT DOCUMENTS 4,190,334  2/1980  O'Neil ................................. 351/137
4,331,393  5/1982  Bradley, Jr. ........................... 351/138

*Primary Examiner*—Huy Mai
*Attorney, Agent, or Firm*—Elbie R. de Kock

[57] ABSTRACT

Eyewear 10 comprises a frame 12 for housing a pair of lenses 14 therein. The frame 12 has a bridge portion 16 for bridging a user's nose and a pair of temple members 18 for locating the frame 12 in position on the head of a user. The frame 12 has a nose pad 20 in the form of a projection extending downwardly from the bridge portion 16 for resting by gravity on the frontal part of the bridge of a user's nose at the origin of the nose. According to another embodiment, a nose pad 30 which is detachable from the frame 12 is provided. The frame 12 and the nose pad 30 are provided with mutually engaging formations 32, 34 for detachably attaching the nose pad 30 to the frame 12.

20 Claims, 5 Drawing Sheets

EYEWEAR AND NOSEPAD FOR USE WITH EYEWEAR

FIELD OF THE INVENTION

This invention relates to eyewear and, in particular, to eyewear with a nose pad for resting on a user's nose, as well as a nose pad for use with eyewear.

BACKGROUND OF THE INVENTION

Eyewear which comprises a frame housing a pair of lenses and having a bridge portion and temple members for locating the frame on a user's face, has the disadvantage that it tends to slip down a user's nose. This happens despite the provision of nose pads which rest against the opposite sides of a user's nose. The problem is particularly common during hot weather due to perspiration which is present on a user's face. The conventional arrangement also provides little or no protection against shocks due to impact with other objects.

It is accordingly an object of the present invention to provide eyewear which alleviates the above difficulties.

SUMMARY OF THE INVENTION

According to the invention there is provided eyewear comprising a frame for housing a pair of lenses therein, the frame having a bridge portion for bridging a user's nose and a pair of temple members for locating the frame in position on the head of a user, the frame having a nose pad in the form of a projection extending downwardly or rearwardly from the bridge portion for resting by gravity on the frontal part of the bridge of a user's nose at the origin of the nose.

Further according to the invention there is provided eyewear comprising a lens member for extending across a user's eyes and having a bridge portion for bridging a user's nose, the lens member having a nose pad in the form of a projection extending downwardly or rearwardly from the bridge portion for resting by gravity on the frontal part of the bridge of a user's nose at the origin of the nose.

The projection may be located substantially centrally of the bridge portion.

The nose pad may be integral with the bridge portion or it may be detachable from the bridge portion. The frame and the nose pad may be provided with mutually engaging formations for removably attaching the nose pad to the frame. Alternatively, the nose pad may be attached to the bridge portion by means of an adhesive.

Also according to the invention, there is provided eyewear comprising a frame for housing a pair of lenses therein, the frame having a bridge portion for bridging a user's nose and a pair of temple members for locating the frame in position on the head of a user, the frame being provided with a formation thereon for engaging with a nose pad in the form of a projection for extending downwardly or rearwardly from the bridge portion for resting by gravity on the frontal part of the bridge of a user's nose at the origin of the nose.

Further according to the invention there is provided a nose pad having a formation thereon for engaging with a frame having a bridge portion for bridging a user's nose and a pair of temple members for locating the frame in position on the head of a user, the nose pad being in the form of a projection for extending downwardly or rearwardly from the bridge portion of the frame for resting by gravity on the frontal part of the bridge of a user's nose at the origin of the nose.

The nose pad may be of a deformable material which deforms to acquire the shape of a user's nose. It is preferably of a material which is slip resistant. It may be of a material which becomes somewhat softened or somewhat sticky to the touch when exposed to ambient or body heat, to resist sliding down the nose of a user.

Other objects and advantages of the invention will become apparent from the description of a preferred embodiment of the invention below.

BRIEF DESCRIPTION OF THE DRAWINGS

The invention will now be described, by way of examples, with reference to the accompanying drawings, in which.

DETAILED DESCRIPTION OF PREFERRED EMBODIMENT

Figure 1:
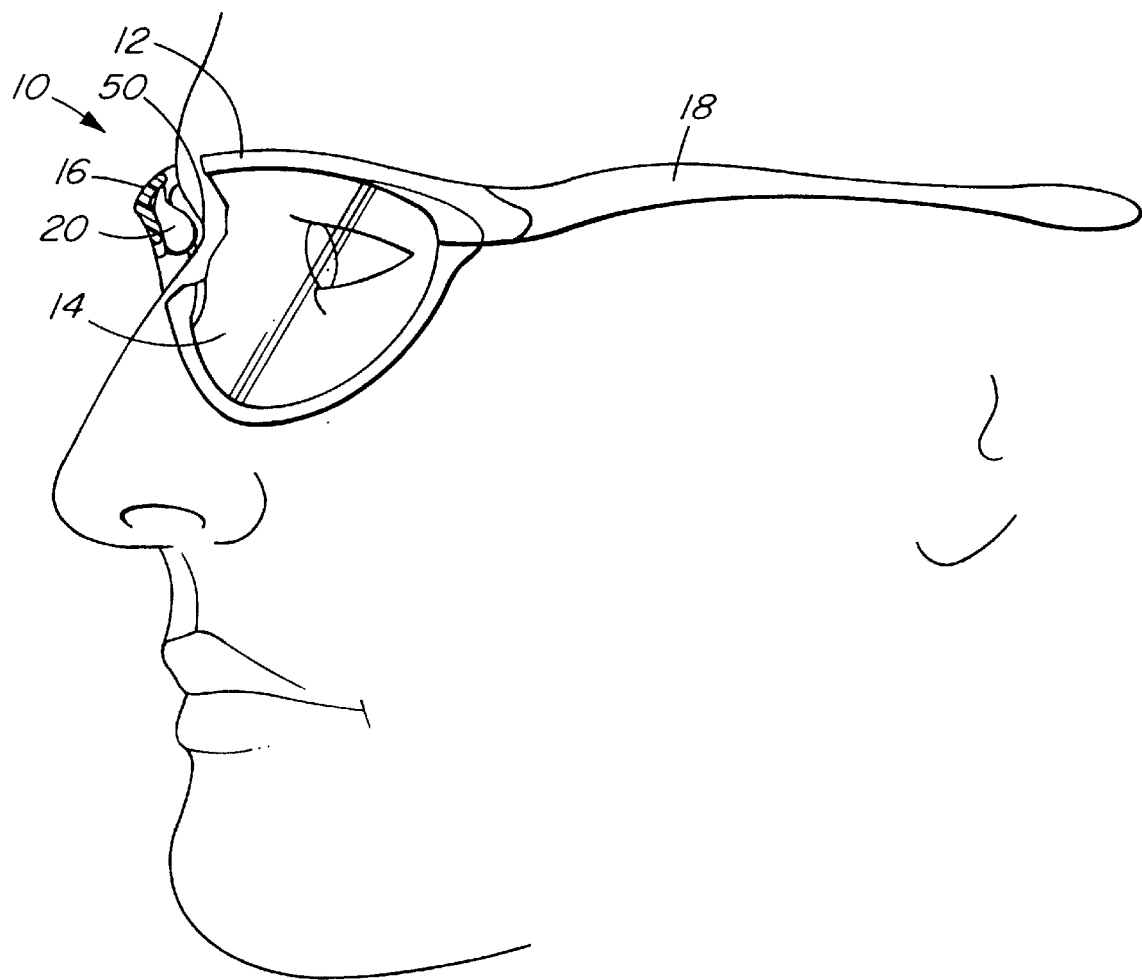
FIG. 1 is a side view showing eyewear according to the invention located in position on a user's face.

With reference to FIG. 1, reference numeral 10 generally indicates eyewear comprising a frame 12 housing a pair of eye lenses 14 and having a bridge portion 16 for spanning a user's nose and a pair of temple members 18 for locating the eyewear 10 on a user's face.

The eyewear 10 includes a nose pad 20 which is in the form of projection extending downwardly from the center of the bridge portion 16. The nose pad 20 has a rounded lower portion which rests by gravity on the frontal part of the user's nose at the origin of the nose. The nose pad 20 is of a flexible or resilient material and may be made of, or contain, for example silicone. In this way, the nose pad 20 locates the frame 12 comfortably in position and counteracts the frame 12 from sliding down the front of a user's nose. It also provides protection against shocks resulting from impact of the frame 12 with another object.

Figure 2:
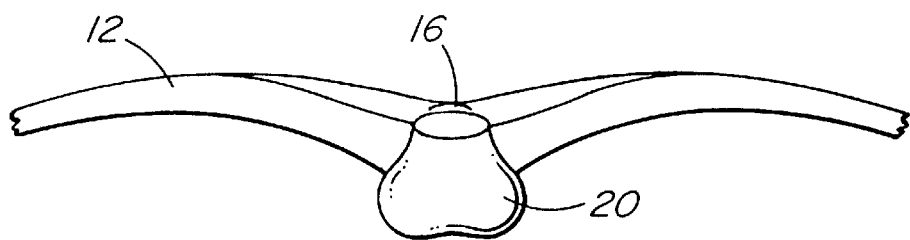
FIG. 2 is a fragmentary rear view of the eyewear of FIG. 1.

A rear view of the nose pad 20 is shown in FIG. 2.

Alternatively, the eyewear may comprise a frame for holding a unitary lens having a bridge portion framed in the lens to accomodate the user's nose. It will be appreciated by those skilled in the art that the nose pad 20 may be mounted on the bridge portion of the lens member itself rather than on the frame.

Figure 3:
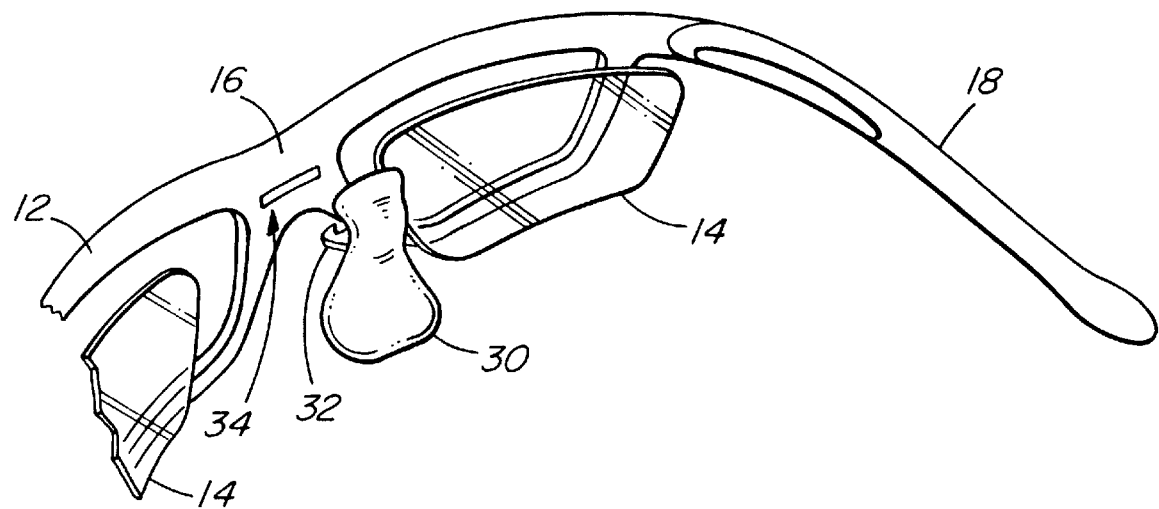
FIG. 3 is a three-dimensional view of eyewear showing a detachable nose pad according to the invention.

In FIG. 3, another embodiment of the invention is shown in which a nose pad 30 which is detachable from the frame 12, is provided. The temple members (only one being shown) are again indicated by reference numeral 18, the eye lenses by reference numeral 14 and the bridge portion by numeral 16.

As can be seen, the nose pad 30 is provided with a lip 32 and the bridge portion 16 of the frame 12 is provided with a matching slot 34 for removably attaching the nose pad 30 to the frame 12. In this way, a variety of different nose pads 30 may be provided for attachment to the frame 12 to suit a user's preferences, or to replace a used nose pad.

As an alternative to the lip 32 and slot 34, any other suitable type of snap in or clip on connection may be provided for removably attaching the nose pad 30 to the frame 12.

In the present example the nose pads 20, 30 are shown as having a rounded lower portion but any other shape which will comfortably locate the nose pads 20, 30 in the depression (indicated at 50 in FIG. 1) at the origin of a user's nose may be used.

The nose pad 30 may be of materials of different hardness. For example, the upper part of the nose pad 30 containing the lip 32 may be of a harder material than the lower part resting on the nose, which would be of a relatively soft material. The nose pad 30 may be of a material which becomes somewhat softened or sticky to the touch when exposed to ambient or body heat, to resist sliding down the nose of a user.

The nose pad 30 may be a hollow member which is filled with air or a flexible or deformable filler material, such as silicone.

It can be seen that the nose pad 20, 30 effectively forms a sac which seats in the depression 50 to locate the frame 12 in position and to protect against impacts both from the front and the side of the frame 12. If desired additional fit elements, such as pads which rest against the opposite sides of the nose, may also be provided.

Figure 4A:
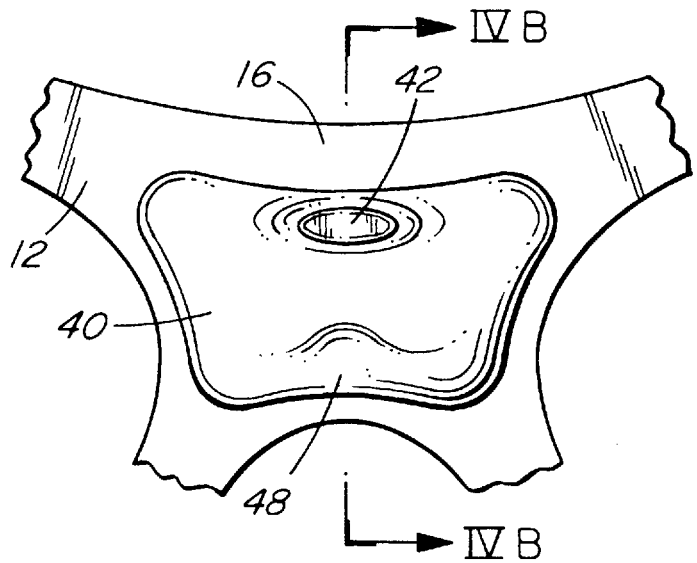
FIG. 4A is a fragmentary rear view of eyewear with a nose pad according to another embodiment of the invention.
Figure 4B:
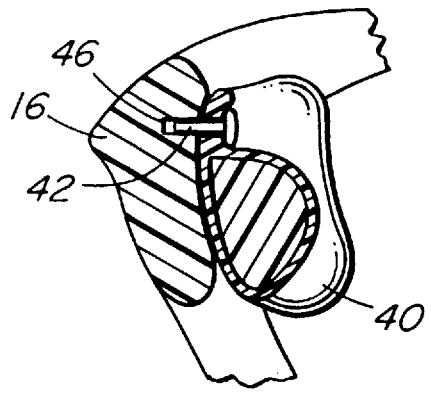
FIG. 4B is a section taken along the lines IVB—IVB in FIG. 4A.
Figure 4C:
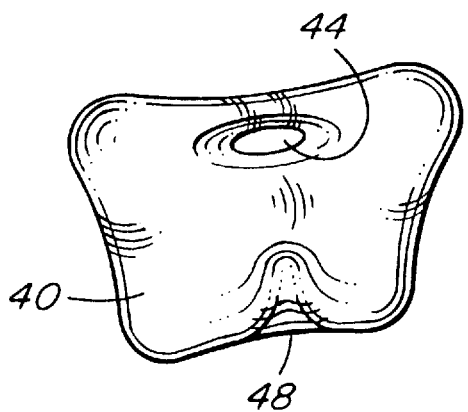
FIG. 4C is a three-dimensional view of the nose pad of FIG. 4A.

Referring now to FIGS. 4A to C, a nose pad 40 according to another embodiment of the invention is shown. The nose pad 40 is in the form of a sac which is removably attached to the bridge portion 16 of the frame 12. It is attached by means of a pin 42 which extends through an opening 44 in the nose pad 40 and clips into a recess 46 in the bridge portion 16, as shown. When attached to the rear of the bridge portion 16, the nose pad 40 extends somewhat rearwardly and downwardly from the bridge portion. It is provided with a central indent 48 at its lower end for seating on the frontal part of the bridge of a user's nose. The nose pad 40 may be of a material which deforms to acquire the shape of a user's nose and which is slip resistant.

Figure 5A:
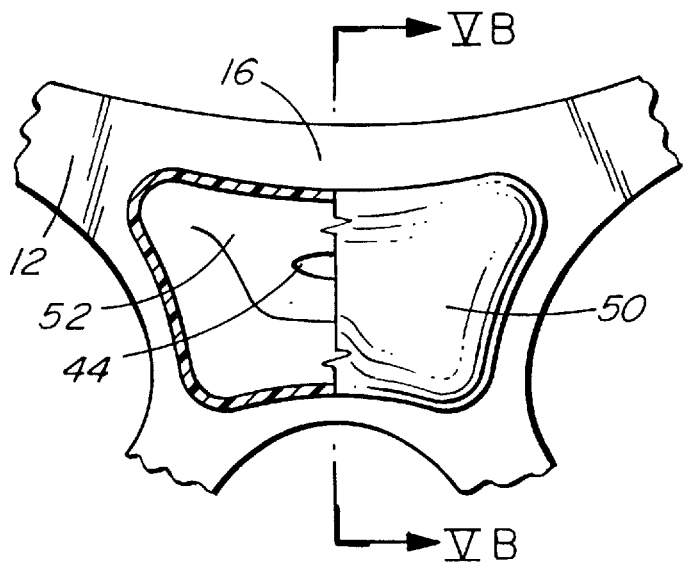
FIGS. 5A to C are views similar to FIGS. 4A to C, but showing a nose pad according to another embodiment of the invention.
Figure 5B:
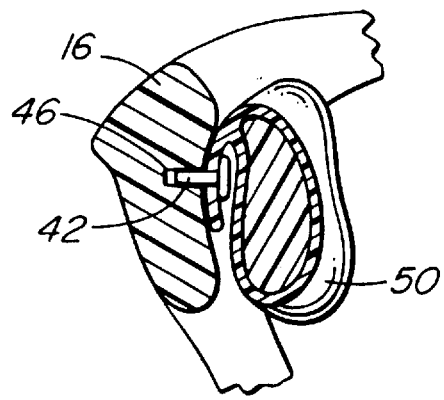
Figure 5C:
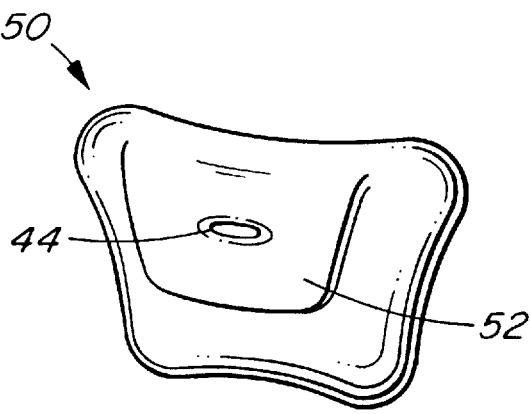

Referring to FIGS. 5A to C, a nose pad 50 according to another embodiment of the invention is shown. In FIG. 5A, the rear side of the nose pad 50 is shown to the right of the section line VB—VB and the front side (i.e. the side facing away from a user's face) is shown to the left of the section line. In this embodiment the nose pad 50 has a flap 52 which has the opening 44 for receiving the fastening pin 42 therethrough.

Figure 6A:
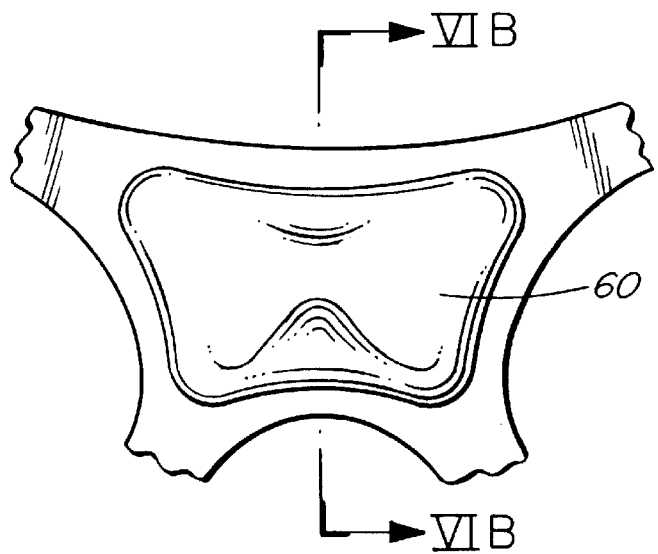
FIG. 6A is a fragmentary rear view of eyewear with a nose pad according to yet another embodiment of the invention.
Figure 6B:
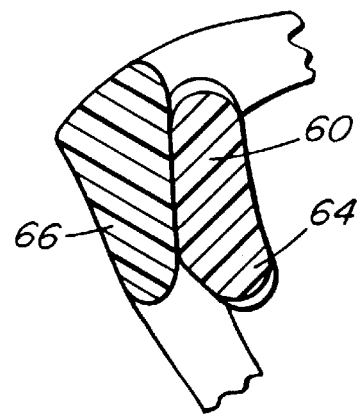
FIG. 6B is a sectional view taken along lines VIB—VIB of FIG. 6A.
Figure 6C:
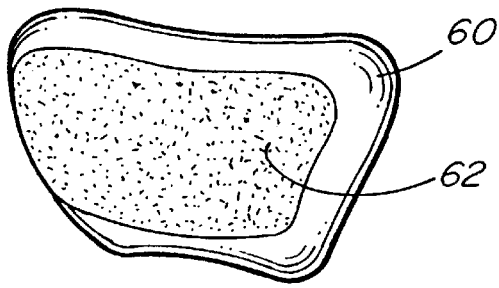
FIG. 6C is a perspective rear view of the nose pad of FIG. 6A.
Figure 7:
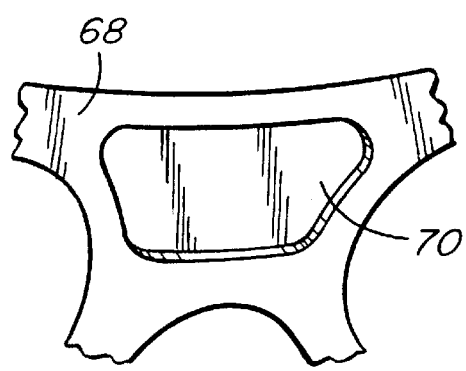
FIG. 7 is a fragmentary perspective rear view of a further embodiment of an eyewear frame for use with the nose pad of FIG. 6A.

Referring now to FIGS. 6A to C, a nose pad 60 according to yet another embodiment of the invention is shown. The nose pad 60 is in the form of a sac, the rear portion 62 being intended to engage the bridge portion of the frame or eyepiece. The rear portion 62 may be provided with a material which is relatively stickier than the material forming the rest of the sac 60. Alternatively, the rear portion 62 may be made of the same material as the rest of the sac 60 but may be provided with an adhesive coating for securing the nose pad to the bridge portion of the frame.

Nose pad 60 may further comprise a silicone material having a skin formed around the silicone material but allowing an exposed portion corresponding to rear portion 62. By selection of the appropriate silicone material, exposed rear portion 62 can thereby be provided with a stickier surface than the skin surrounding the balance of nose pad 60. Such skin may for example be vacuum formed partly around the nose pad 60 leaving exposed rear portion 62.

As illustrated in FIG. 6B, the nose pad 60 may also be provided with a rearwardly and downwardly extending portion 64 so as to provide an area between portion 64 and bridge portion 66 of the frame into which the portion 64 may be deformed when the frame is subjected to a rearward impact.

The frame 68 may also be provided with a recessed area 70 corresponding in shape to the rear portion 62 of the nose pad so as to enhance the retention of the nose pad to the frame 68.

While only preferred embodiments of the invention have been described herein in detail, the invention is not limited thereby and modifications can be made within the scope of the attached claims.

What is claimed is:

1. Eyewear comprising a frame for housing a pair of lenses therein, the frame having a bridge portion for bridging a user's nose and a pair of temple members for locating the frame in position on the head of a user, the frame having a nose pad in the form of a projection extending downwardly from the bridge portion for resting by gravity on the frontal part of the bridge of a user's nose at the origin of the nose.

2. The eyewear according to claim 1, wherein the projection is located substantially centrally of the bridge portion.

3. The eyewear according to claim 1, wherein the nose pad is detachable from said bridge portion.

4. The eyewear according to claim 3, wherein the frame and the nose pad are provided with mutually engaging formations for removably attaching the nose pad to the frame.

5. The eyewear according to claim 4, wherein said mutually engaging formations comprise a slot in the bridge portion of the frame and a lip on the nose pad for engaging with the slot.

6. The eyewear according to claim 1, wherein the nose pad comprises an upper portion and a lower portion with the bulk of the nose pad being in the lower portion.

7. The eyewear according to claim 6, wherein the lower portion has a substantially rounded shape in side view for seating the nose pad in position on the bridge of a user's nose at the origin of the nose.

8. The eyewear according to claim 1, wherein the nose pad is of a flexible material.

9. Eyewear comprising a frame for housing a pair of lenses therein, the frame having a bridge portion for bridging a user's nose and a pair of temple members for locating the frame in position on the head of a user, the frame being provided with a formation thereon for engaging with a nose pad in the form of a projection for extending downwardly from the bridge portion for resting by gravity on the frontal part of the bridge of a user's nose at the origin of the nose.

10. The eyewear according to claim 9, wherein said formation comprises a slot in the bridge portion of the frame for engaging with a lip on the nose pad.

11. The eyewear according to claim 9, wherein said formation comprises a projection on the bridge portion of the frame for engaging with the nose pad.

12. A nose pad having a formation thereon for engaging with a frame having a bridge portion for bridging a user's nose and a pair of temple members for locating the frame in position on the head of a user, the nose pad being in the form of a projection for extending downwardly from the bridge portion of the frame for resting by gravity on the frontal part of the bridge of a user's nose at the origin of the nose.

13. A nose pad according to claim 12, wherein said formation comprises a projection on the nose pad for engaging with a recess in the bridge portion of the frame.

14. The nose pad according to claim 12, wherein the formation comprises a recess in the nose pad for engaging with a projection on the frame.

15. A nose pad according to claim 12, further comprising a deformable and sticky material, a skin formed partly around said sticky material so as to leave an exposed rear portion of said nose pad adapted to adhere to said bridge portion.

16. A nose pad according to claim 15, wherein said skin is vacuum formed.

17. Eyewear comprising a frame for housing a pair of lenses therein, the frame having a bridge portion for bridging a user's nose and a pair of temple members for locating the frame and position on the head of a user, a nose pad adhesively retained to said bridge portion for resting by gravity on the frontal part of the bridge of a user's nose at the origin of the nose.

18. The eyewear according to claim 17, wherein said nose pad is provided with an adhesive portion adapted to adhere to said bridge portion of the frame, said adhesive portion being of a different material than the balance of said nose pad.

19. The eyewear according to claim 17, wherein said nose pad includes a downwardly and rearwardly projecting portion defining a space between said downwardly and rearwardly projecting portion and said bridge portion when said nose pad is adhered to said bridge portion.

20. The eyewear according to claim 17, wherein said bridge portion is provided with a recess corresponding in shape to a rear portion of said nose pad, and wherein said rear portion of said nose pad is engaged in and adhered to said recess.

* * * * *